Aug. 8, 1939.　　　G. L. REENSTIERNA　　　2,168,684
VEHICLE AUTOMATIC SIGNAL
Filed Feb. 19, 1936
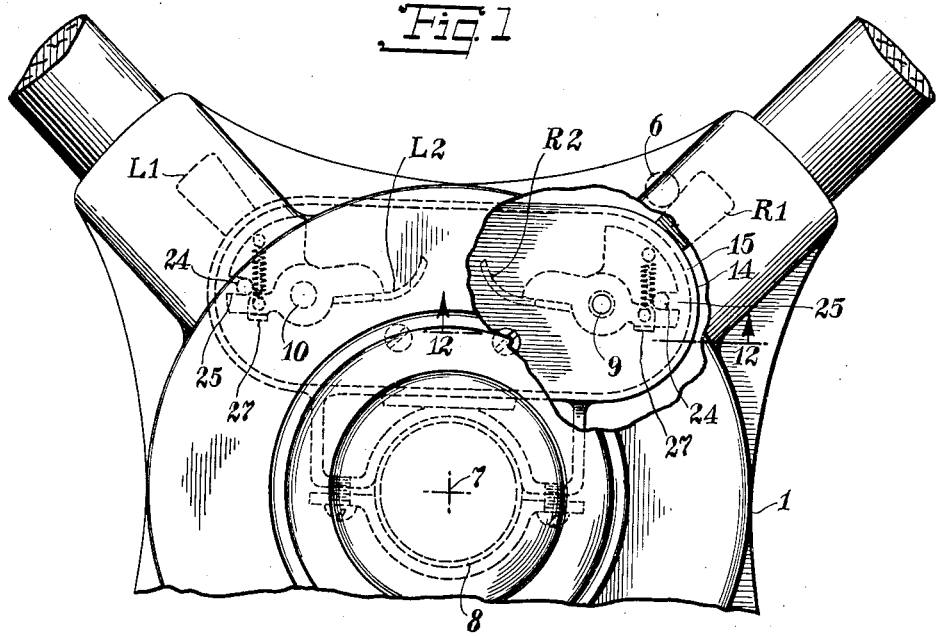
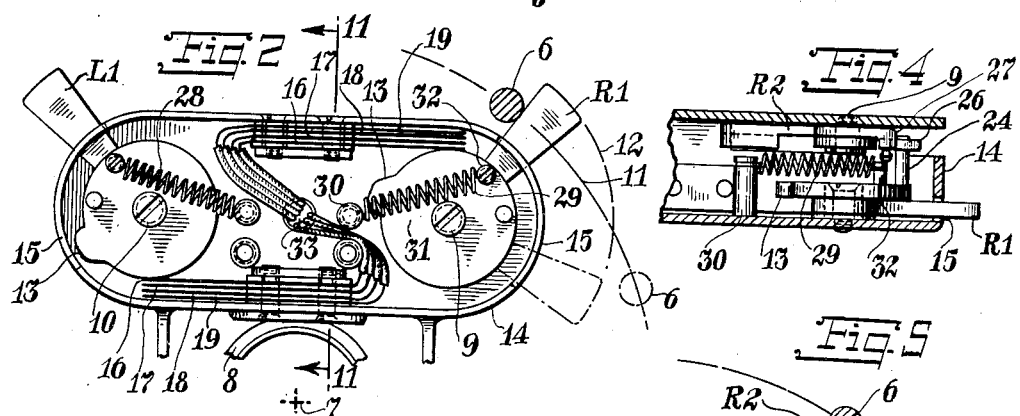
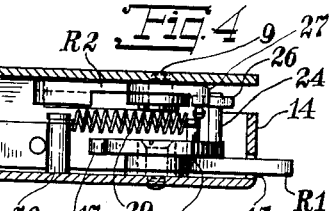
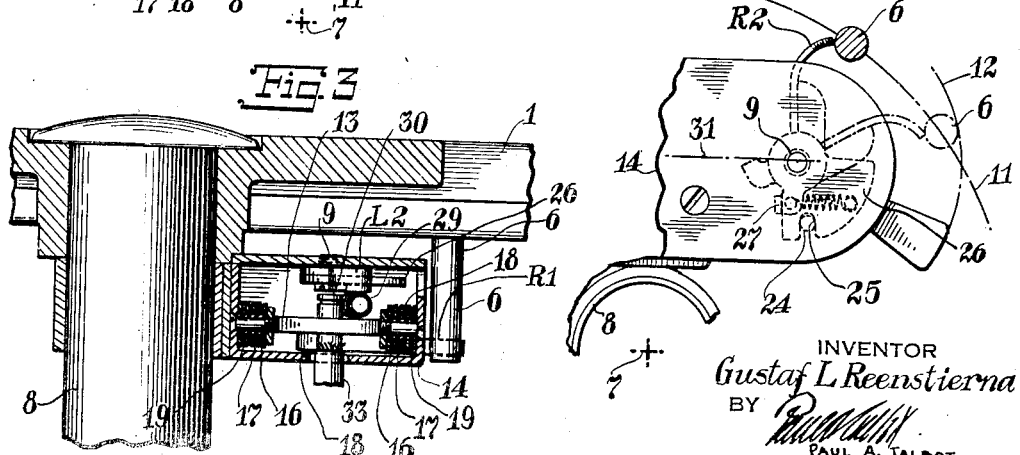
INVENTOR
Gustaf L Reenstierna
BY
Paul A. Talbot
ATTORNEY

UNITED STATES PATENT OFFICE 2,168,684

VEHICLE AUTOMATIC SIGNAL

Gustaf L. Reenstierna, Union City, N. J., assignor of one-third to Frank Zamorski, Jersey City, N. J., and one-third to James A. O'Donnell, Union City, N. J., and one-third to Albert E. Pennie, Union City, N. J.

Application February 19, 1936, Serial No. 64,681

5 Claims. (Cl. 200—59)

My invention relates to a signal for vehicles and particularly to a signal for notifying an overtaking vehicle of the intentions of the operator of the vehicle ahead in turning or stopping and has among its objects to provide:

A device actuated by the controlling mechanism of a vehicle such as the steering wheel and brake lever to signal an overtaking vehicle.

A simple electrically operated device plainly visible at the rear of a vehicle which automatically shows the direction of the turn or the stopping of the vehicle.

A switch having a progressive completion of a plurality of circuits one after the other to operate the rear signal by the operation of a vehicle steering wheel.

A signaling device operated by the successive completion of several operating circuits.

A weather and water proof signaling device having the operating parts easily accessible for inspection repair and the renewal of the signal light.

A compact and shock proof device for automatically signaling the movement of the vehicle.

I accomplish these and other objects by the construction herein described and shown in the accompanying drawing forming a part hereof in which—

Figure 1 is a fragmentary view of the steering wheel and direction indication controlling switches.

Figure 2 is a partial section and plan of the direction indicating control switches.

Figure 3 is a fragmentary section of the steering wheel and direction indicating control switches at 11 Figure 1.

Figure 4 is a fragmentary detail and section at 12 Figure 1.

Figure 5 is fragmentary plan views of one of the control switches.

Similar reference characters refer to similar parts throughout the several views of the drawing and in the following specification.

In describing the operation of the parts and their relationship for the sake of brevity they are herein referred to as animate rather than inanimate; it being understood that the operator or driver of the vehicle is, in his normal and usual acts and operations of the steering wheel, brake and the other acts such as his control of the motor during the ordinary functions in effecting the control of his vehicle rather than, as herein stated, by the parts affecting the control. Thus, for example, when the wheel turns right the signal indicates a right turn and when the wheel turns left the signal indicates the vehicle is turning left and further when the vehicle or car is stopping the indication shown by signal is "stop".

Near the steering wheel 1 I have arranged to coact with it the switch housing 2 and its operating parts which control several electric circuits and the rear signal.

On the steering wheel 1 which may be any of the conventional types used in directing vehicles, I have provided a depending stud 6 which it will be seen is so positioned revolving as it does about the center 7 of the steering post 8 to contact the right lever R1 and right release lever R2 and the left lever L1 and left release lever L2; levers R1 and R2 swing about the center 9 while levers L1 and L2 swing about the center 10. The moving of the stud 6 along the path 11 shown in broken lines in Figure 2, it will be seen, permits said stud to engage said lever R1 later to release it from being carried further due to the path 12 of the end of the lever crossing the path 11 of the stud and thereby traveling beyond the position of engagement of said stud and lever.

The levers R1 and L1 are directly attached to the insulated cams 13 rotatably mounted within the switch housing 14 and travel about the centers 9 and 10, said levers passing through the slots 15 in said housing 14 to the exterior. The cams, switches, and levers on the right and left sides are substantially the same so that the description of one will serve for the other.

The cams 13 engage and depress the several switch leaves 16, 17, 18 and 19 each of which is insulated from the other and connects an independent circuit, one group or set of leaves connects the several right circuits and the other group or set of leaves connects the several left circuits. Both right and left circuits are completed in sequence and thus, for instance, as lever R1 is swung by the stud 6 on the steering wheel to the position shown in broken lines all the circuits will be completed as the leaves 16 are connected to the battery or other source of current 20 and as the movement of the levers R1 and L1 bring the cams 13 against the leaves 16 and then by further movement depress said leaves 16 to contact the leaves 17 the first circuit will be completed resulting in the case of the movement of lever R1 and the cam actuated by it in causing current to pass to an electromagnet in the signal designating a right turn or if the lever L1 is moved as will take place when the steering wheel 1 is moved to the left the same result of controlling the positive or battery wire through the leaf 16 on the left to the leaf 17 on the left which in turn supplies current to an electromagnet in the signal designating a left turn.

As the further movement of the cams is caused by the further movement of the steering wheel 1 and either of the levers R1 or L1, depending on the direction of movement of the steering wheel 1 and consequent movement of the direction of the vehicle so steered, the leaves 16, 17, and 18 are connected, the leaves 18 being connected to the electromagnets in the signal. Likewise a further movement of the steering wheel 1, levers R1 and L1 and cams 13 will further depress the leaves 16, 17 and 18, until contacting the leaves 19 and the completion of the circuits connected to these leaves 19 and the light in the signal.

Thus all of the circuits are completed on one side either right or left depending on the movement of the steering wheel 1. The further operation of the parts operated by the completion of the circuits above described may be followed by a description of the details of their construction. Of course, many more circuits may be added to act in sequence to those herein described which are limited for the sake of brevity to a few only of the many functions and signals of which my device is capable.

When the steering wheel 1 has been turned to the right or left as the vehicle is steered on its return from the extreme position, the stud 6 engages one of the levers R2 or L2 depending on the returning direction of movement of the steering wheel 1 to the "straight ahead" position. Either of said levers R2 or L2 move the cam 13 out of engagement with the leaf switches 16, 17, 18 and 19 thus opening the circuits connected with said leaf switches and therefore permitting the signal to be returned to its normal position at which no "turn" or "stop" signal is indicated.

Both levers R2 and L2 are so attached to move said cam 13 in one direction only and are yieldingly and swingingly mounted to turn about the center 9 in the opposite position without moving said cam as is the case when said stud 6 has been made to travel more than one revolution.

By referring to Figures 1 and 5 the extreme positions of travel of lever R2 may be seen. The broken lines in Figure 5 representing the "by travel" of said lever when said stud 6 engages said lever on the second revolution.

The levers R2 and L2 are not directly connected to the cams 13 as are the levers R1 and L1 but drive said cams by means of the studs 24 secured thereto, which engage the notches 25 of the oscillating arms 26 which engage the bosses 27 of said levers R2 and L2. Said bosses 27 are held normally in contact with said arm 26 by the springs 28, 29 but are separated and permitted to by travel when said stud 6 engages said levers R2 and L2 the second revolution.

The cams 13 are preferably moved to their extreme positions by the springs 28, 29 which are so mounted that any movement of said cams in either direction beyond their mid-position will result in their being carried to their extreme positions. The springs 28, 29 are secured at their one end to the studs 30 on the center line 31 on which the centers 9 and 10 are also positioned. The opposite ends of said springs 28, 29 are secured to the swinging studs 32 which are secured to the cams 13. The studs 32 travel across said centerline 31 at which point said springs 28, 29 are at the maximum tension and at which position the centers 9 and 10 as well as the studs 30 and 32 coincide in alignment on said center line 31 (a "dead" center as regard to any movement of the cams 13 by said springs 28, 29).

The housing 14 with its switches and levers, etc., is connected, by cable or conduit 33 having the various circuits, to the signal as well as to the source of supply of electric current.

The cable or conduit 33 with its circuits from the "steering" switches above described connects the switches to the signal.

I have herein described in detail the construction and operation of my device so that it may be easily understood but I do not wish to be limited to the detailed construction herein disclosed as I may wish to make such modifications as seem desirable to suit it to the many applications and uses for which it is adapted and I may wish to depart from the details within the scope of the appended claims which succinctly set forth my invention.

I claim:

1. In a signal, a vehicle steering wheel having a stud secured thereto and swinging therewith, a switch housing and levers swingingly mounted therein engaging said stud, one of said levers positioned to swing out of engagement with said stud and the other of said levers held in movable relationship to said first lever adapted to engage said stud when moved in the opposite direction and movable out of the position of engagement when said stud moves in the same direction.

2. In a signal, a vehicle steering wheel having a stud secured to and moved by said steering wheel, pairs of levers engaging said stud, one of the levers in each pair of levers movable relative to the other lever of each pair of levers positioned to engage said stud when traveling in the opposite direction and permitting said stud to travel by and beyond said lever when traveling in the same direction, and switches electrically connected to said signal and operated by said levers.

3. In a signal, a steering post and a housing secured thereto having levers and switches operated by said levers mounted in said housing, a steering wheel and a stud secured thereto engaging said levers to operate said switches, said levers swingingly mounted in said housing on centers varying from the center of said steering wheel whereby said stud engages and disengages said levers in its path of travel in one direction in respect to one of said levers and in the opposite direction of travel with respect to the other of said levers, and release levers mounted in movable relationship to said levers engaging said stud to reset said levers and the switches operated thereby and permitting said steering wheel and the stud secured thereto to pass by and beyond said release lever when said steering wheel is turned more than one revolution.

4. In a signal having a switch housing, a steering post and means securing said housing to said steering post, levers and switches operated by said levers, a steering wheel and stud secured thereto engaging said levers to operate said switches, said levers swingingly mounted in said housing on centers varying from the center of said steering wheel whereby said stud engages and disengages said levers in its path of travel in one direction in respect to one of said levers and in the opposite direction of travel with respect to the other of said levers, and release levers engaging said stud to reset said levers and the switches operated thereby and cams moved by said levers and release levers to operate said switches, springs positioned to swing said cams to a greater distance of travel than said levers, said levers and release levers permitting said wheel and stud to revolve more than one revolution without effecting motion of said cam.

5. In a signal, a switch housing, a steering post and means securing said housing to said steering post, levers and switches operated by said levers, a steering wheel and stud secured thereto engaging said levers to operate said switches, said levers swingingly mounted in said housing on centers varying from the center of said steering wheel whereby said stud engages and disengages said levers in its path of travel in one direction in respect to one of said levers and in the opposite direction of travel with respect to the other of said levers, and release levers engaging said stud to reset said levers and the switches operated thereby and cams moved by said levers and release levers to operate said switches, springs positioned to swing said cams to a greater distance of travel than said levers beyond the dead center between the extremes of travel of said cams.

GUSTAF L. REENSTIERNA.